United States Patent
Larson

[15] 3,677,569
[45] July 18, 1972

[54] FOLDABLE CRAWLER
[72] Inventor: Howard M. Larson, 1005 13th St., Ames, Iowa 50010
[22] Filed: March 9, 1970
[21] Appl. No.: 17,410

[52] U.S. Cl. ............................ 280/32.6, 108/44, 108/63, 280/37, 280/87.05
[51] Int. Cl. .................................. B62b 11/00, B25h 5/00
[58] Field of Search .............. 280/32.6, 37, 32.5, 43, 43.13, 280/43.16; 108/44, 63

[56] References Cited

UNITED STATES PATENTS

| | | | |
|---|---|---|---|
| 2,729,905 | 1/1956 | Crozier | 108/63 |
| 2,908,472 | 10/1959 | McDonald | 280/159.5 UX |
| 324,617 | 8/1885 | Walsh et al. | 280/37 |
| 1,409,787 | 3/1922 | Scarlett | 280/37 |
| 1,098,262 | 5/1914 | Hollingshead | 280/32.6 |
| 1,394,493 | 10/1921 | Grazer | 280/32.6 X |
| 724,125 | 3/1903 | Prindle | 108/63 X |
| 2,650,374 | 9/1953 | Pierce | 108/44 X |
| 1,785,646 | 12/1930 | Pascoo | 280/43 |

Primary Examiner—Benjamin Hersh
Assistant Examiner—John P. Silverstrim
Attorney—Henderson & Strom

[57] ABSTRACT

A foldable crawler is provided herein which, in its folded position, has a valise-like configuration. The crawler comprises a bottom side having wheels mounted thereon, sidewalls, and a top side. An extender is hingeably attached at one end to one end of the top side. A wheel is affixed to the top surface of the extender. in its folded position, proximate the other end of the extender. The extender can be rotated 180° and the wheel on the extender can contact a raised surface, such as the floor inside a kitchen cabinet, to provide a substantially flat, rollable working surface.

7 Claims, 6 Drawing Figures

Patented July 18, 1972
3,677,569
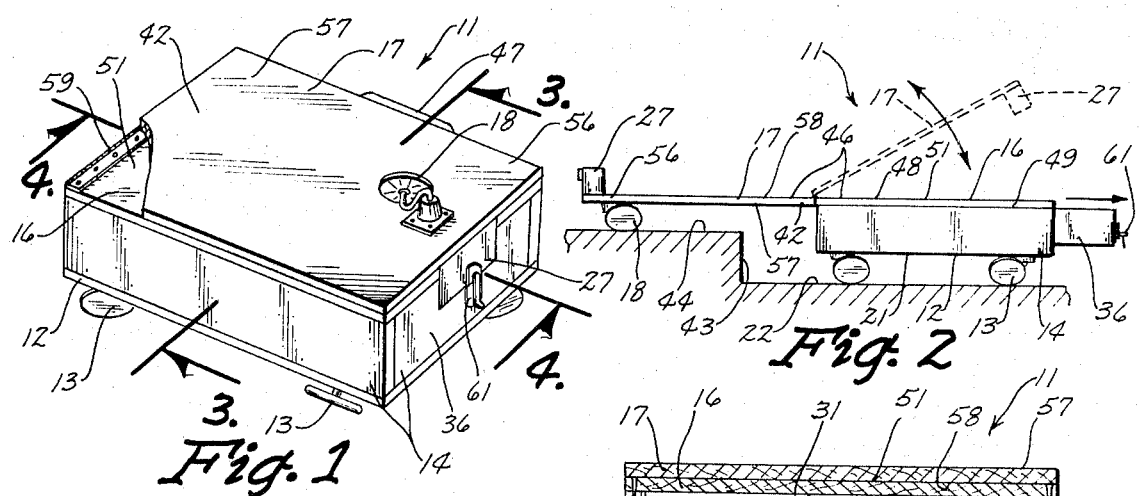
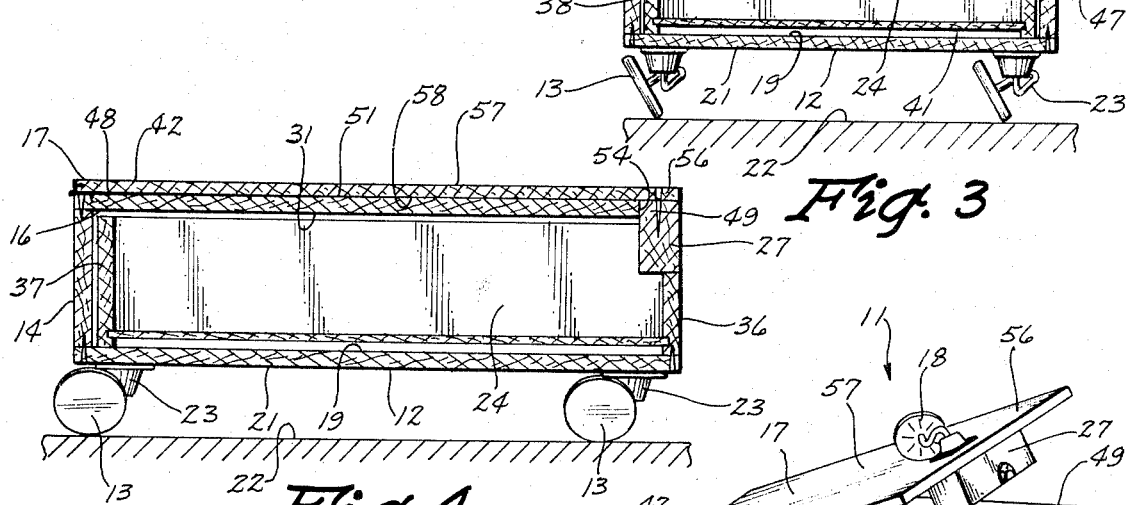
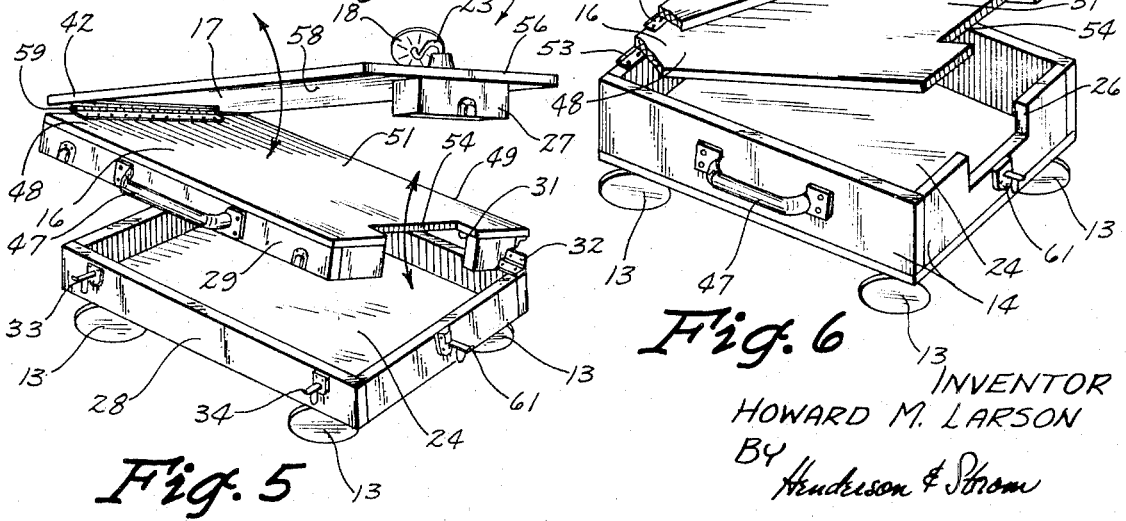
INVENTOR
HOWARD M. LARSON
BY Henderson & Strom
ATTORNEYS

FOLDABLE CRAWLER

BACKGROUND OF THE INVENTION

This invention relates to a foldable crawler especially designed for plumbers to facilitate working under a kitchen sink. This crawler can, of course, be used in many other similar circumstances.

Wheeled crawlers of various configurations have been used for a variety of jobs. These crawlers are exemplified by Henry, U.S. Pat. No. 2,611,417; Zuckerman, U.S. Pat. No. 2,471,553; Raymond U.S. Pat. No. 1,603,212; Rau, U.S. Pat. No. 1,510,104; and Grazer, U.S. Pat. No. 1,394,493.

However, none of these crawlers facilitate working in a supine position over a raised surface. All plumbers that work in houses must spend much of their time under kitchen and bathroom sinks unclogging drain, installing and maintaining garbage disposals, and the like. The inside floor surface under these sinks is usually raised and presents a very uncomfortable working surface for a workman in the supine position.

This invention is designed to provide a compact, foldable crawler which when unfolded provides a flat, surface for the workman under sinks and the like. Tools can also advantageously be carried in the inner recess of this crawler.

SUMMARY OF THE INVENTION

This invention relates to a foldable crawler having a valise-like configuration in its folded position. The crawler comprises a bottom side, sidewalls extending upwardly of the bottom side, and a top side having two ends normally juxtaposed of at least two of the sidewalls. Wheels are affixed to the lower surface of the bottom side. An extender is hingeably attached at one end to one end of the top side and is rotatable around the hinges. In its folded position, the bottom surface of the extender is juxtaposed of the top surface of the top side. A wheel is affixed to the top surface of the extender on the other end thereof.

It is an object of this invention to provide a foldable crawler which provides a flat working surface over a floor and a raised surface, such as the floor of a kitchen cabinet.

Another object is to provide a rollable working surface over a floor and a raised surface.

A further object is to provide a foldable crawler having a tool drawer formed therein as an integral part.

BRIEF DESCRIPTION OF THE DRAWINGS

FIG. 1 is a perspective view of the foldable crawler of this invention.

FIG. 2 is a side view of the crawler in its extended position and illustrating, in phantom, the rotation of the extender.

FIG. 3 is an enlarged, cross sectional view of the crawler taken along line 3—3 of FIG. 1.

FIG. 4 is an enlarged, cross-sectional view of the crawler taken along line 4—4 of FIG. 1.

FIG. 5 is a perspective view of a second embodiment of this crawler.

FIG. 6 is a perspective view of a third embodiment of this crawler.

DESCRIPTION OF THE PREFERRED EMBODIMENTS

Referring now to the drawings, the crawler of this invention is indicated generally at 11 in FIGS. 1–6. The crawler 11 comprises a bottom side 12 having wheels 13 mounted thereon, sidewalls 14, and a top side 16. An extender 17 is hingeably attached to the top side 16 and has a wheel 18 secured thereto.

More specifically, the crawler 11 in its folded position, is of valise-like or box-like configuration. In the embodiments illustrated in FIGS. 1–6, the bottom side 12 has an upper surface 19 and a lower surface 21 and is of generally rectangular configuration. Four wheels 13 are mounted on the lower surface 21 for rollably engaging a floor 22 or ground surface. The supports 23 for the wheels 13 are rotatably mounted to allow the wheels 13 to face more than one direction. Although any wheels 13 can be used with this invention, the wheels 13 shown are preferred. These wheels 13 are of nylon construction, roll easily on carpeted floors, and will not mar tile floors.

Sidewalls 14 extend upwardly of the upper surface 19 of the bottom side 12. As illustrated in the drawings, four sidewalls 14, the top side 16, and the bottom side 12 form a tool compartment 24 wherein tools and the like may be stored and carried.

In the embodiment shown in FIG. 6, all four sidewalls 14 are rigidly affixed to the upper surface 19 of the bottom side 12. A notch 26 is formed in one sidewall 14 to allow the pillow portion 27 formed on the extender 17 to extend downwardly below the top side 16.

In the embodiment shown in FIG. 5, the sidewalls 14 are formed in lower sections 28 and upper sections 29. The lower sections 28 are affixed to the upper surface 19 of the bottom side 12 and the upper sections 29 are affixed to the lower surface 31 of the top side 16. The lower sections 28 and upper sections 29 are normally juxtaposed and are attached together by a longitudinally disposed hinge 32. Access to the tool compartment 24 is gained by rotating the upper sections 29 about the hinge 32. Latches 33 and 34 are provided for securing the lower sections 28 and upper sections 29 together in the normally closed position. A notch 26 is formed in one sidewall 14 as in the embodiment of FIG. 6. This construction is particularly adapted for molding the portions from any of the well known plastics or fiberglass.

In the embodiment of FIGS. 1–4, one of the sidewalls 14 is utilized as a portion of a drawer 36 which is formed by that sidewall 14, an endwall 37 and two side portions 38 and 39. The bottom 41 of the drawer 36 is supported by the side portions 38 and 39, the end wall 37 and that sidewall 14. The sidewall 14 utilized as a portion of the drawer 36 is preferably oppositely disposed of the hingeably attached end 42 of the extender 17 to provide easy access thereto.

The sidewalls 14 in all three of these embodiments should range in height from about 2 inches to about 5 inches with 3 ½ inches being particularly preferred. The height of the kickboard 43 or rise from the floor 22 to the cabinet floor 44 under most sinks is about 3 ½ inches. Therefore, when the extender 17 is unfolded, a flat working surface 46 is provided. The working surface 46 is supported on both the floor 22 and the cabinet floor 44 and is rollable thereon.

A carrying handle 47 is also attached to one of the sidewalls 14. The crawler 11, and the tools contained therein, can then be readily carried like a valise.

A top side 16 having two ends 48 and 49 and an upper surface 51 and a lower surface 31 is normally juxtaposed on at least two sidewalls 14 and, in the embodiments of FIGS. 5 and 6, on all four sidewalls 14. In the embodiment of the FIGS. 1–4, the top side 16 is secured to three of the sidewalls 14 while in the embodiment of FIG. 5, the top side 16 is secured to the upper sections 29 of all four sidewalls 14. The top side 16 is hingeably attached at one end 48 by hinges 53 in the embodiment of FIG. 6 The tool compartment 24 is accessible by rotating the top side 16 about its hinges 53 as shown in FIGS. 6. In all of these embodiments, a notch 54 is formed through the other end 49 to provide a recess for the pillow portion 27 on the extender 17.

The extender 17 has two ends 42 and 56 and, in its folded position, an upper surface 57 and a lower surface 58. The extender 17 has substantially the same configuration as the top side 16 and is substantially aligned therewith. The extender 17 is attached at one end 42 by hinges 59 to one end 48 of the top side 16. The extender 17 can be rotated at least 180° around its hinges 59. In its folded position, the lower surface 58 is juxtaposed of the upper surface 51 of the top side 16.

A pillow portion 27 is affixed proximate the other end 56 to the lower surface 58 of the extender 17. The pillow portion 27, when the extender 17 is in its folded position, fits into the notches 26 and 54 to allow the extender 17 to be juxtaposed on the top side 16.

A latch 61 (FIGS. 4–6) is provided for securing the extender 17 in its folded position. In the embodiment of FIG. 6, this latch 61, secures the top side 16 in juxtaposition with the sidewalls 14 while in the embodiment of FIGS. 1–4, the latch 61 also secures the drawer 36 in its closed position.

This crawler 11 is designed primarily for use by plumbers and other maintenance men while working under sinks and the like having a cabinet floor 44 raised above the floor 22 of the room. The crawler 11 is designed to provide a flat working surface 46, in its extended position (FIG. 2), comprising the upper surface 51 of the top side 16 and the lower surface 58 of the extender 17 and is rollable to provide freedom of movement while working.

Although a preferred embodiment has been described, it is to be remembered that various modifications may be made without departing from the invention as defined in the appended claims.

I claim:

1. A foldable crawler having a valise-like configuration in its folded position comprising:

a bottom side having an upper surface and a lower surface;

wheels mounted on said lower surface of said bottom side for rollably engaging a floor or ground surface;

sidewalls extending upwardly of said bottom side;

a top side having two ends and having an upper surface and a lower surface and normally juxtaposed on at least two of said sidewalls;

an extender having two ends and being hingeably attached at one end to one of said ends of said top side and rotatable thereabout; said extender having, in its folded position, an upper surface and a lower surface, said lower surface being juxtaposed of said upper surface of said top side; and at least one wheel affixed to said upper surface proximate the other end of said extender, wherein said at least one wheel is positioned at a higher elevation than said wheels mounted on said lower surface when said extender is rotated to an unfoled positon to provide a substantially flat, rollable working surface consisting of said upper surface of said top side and said lower surface of said extender, said at least one wheel positioned for engaging a surface at a higher elevation than said floor or ground surface.

2. The foldable crawler of claim 1 wherein said extender has substantially the same configuration as said top side and is substantially aligned therewith.

3. The foldable crawler of claim 2 wherein said top side is hingeably attached at one end to one of said sidewalls and rotatable thereabout; and said extender is hingeably attached at one end thereof to said hingeably attached end of said top side.

4. The foldable crawler of claim 1 wherein said sidewalls are formed in a lower section and an upper section;

said lower section being affixed to said bottom side;

said upper section being affixed to said top side; and said lower sections and said upper sections are hingeably attached along one of said sidewalls; and a latch is provided for securing said sections in folded relation.

5. The foldable crawler of claim 1 wherein a drawer is formed and bounded by said bottom side, said sidewalls, and said top side; said sidewall opposite said hinged end of said top side forming the front of said drawer.

6. The foldable crawler of claim 1 wherein a pillow portion is formed on the lower surface of said extender on said other end of said extender.

7. The foldable crawler of claim 1 wherein the sidewall height ranges from about 2 inches to about 5 inches.

* * * * *